United States Patent Office 3,259,972
Patented July 12, 1966

3,259,972
EXOREACTANT MATERIAL FOR BONDING
Roger A. Long, San Diego, Calif., assignor to Whittaker Corporation, a corporation of California
No Drawing. Filed Feb. 1, 1963, Ser. No. 255,663
22 Claims. (Cl. 29—498.5)

The present invention relates to a composition and method for exothermic brazing. More particularly, the present invention is directed to a process in which both the heat required for brazing and the brazed alloy are produced by the exothermic reduction of metallic compounds by a reactive material. The reaction also yields a ceramic phase which must be separated and then displaced from the bondline to allow maximum wetting and bonding by the braze alloy. Additional heat may be required, depending upon the mass and thermal conductivity of the metal to be heated. This additional heat may be provided by an exothermic material positioned external to the bondline, the products of which do not enter into the chemistry of the braze joint or by other suitable means such as furnace.

In general, the requirements for exothermic brazing are the same as those for brazing with the use of a flux. The principal advantages of exothermic brazing are: (1) the short time for which the metals are subjected to high temperatures which allows higher temperatures to be used without excessive metallurgical changes occurring in the base metal and reduces oxidation due to heating, thus eliminating the need for inert, vacuum, and/or reducing protective atmospheres, and (2) the self-heating properties of the exothermic brazing composition which eliminate the need for large brazing furnaces and the like.

The primary criteria for selecting the braze metal are that it must be: (1) compatible with the base metals being joined, (2) compatible with base metal heat treating requirements and (3) possess the necessary mechanical, physical and corrosion resistant properties for the intended use. The selection of the braze alloy is further influenced by the requirement that the metallic oxides to be reduced must be reducible to the metallic phase, not a lower oxide phase, and supply sufficient heat simultaneously with the reduction such that the base metal interface surfaces being joined are heated to the minimum braze wetting temperature.

The principal criteria for the final ceramic phase are that: (1) it must function as a flux in the normal sense, i.e., reduce or remove the base metal oxides that form within the bondline during the short heating cycle, (2) it must have wetting characteristics as well as a melting temperature which allow its displacement from the bondline and (3) it must not leave a corrosive residue. By the nature of the process, the ceramic phase contains a stable compound of the reducing agent used in the exotherm.

Thus, the development of a successful exothermic braze composition depends upon designing a composition of metal and ceramic phases whose properties conform to the criteria described above and which produce the necessary temperatures in the exothermic reaction products and base metal interface surfaces for the brazing process. The useful heat for the reaction must be controlled to fall within a range above that required by the brazing mechanism and below that which causes deterioration of the base metal properties during heating.

Therefore, it is a principal object of the present invention to provide an improved exothermic brazing composition and process.

It is another object of the present invention to provide a nickel-base brazing composition and a process for using this composition.

It is another object of the present invention to provide a brazing composition comprising an oxide-fluoride system and the process of using this composition.

It is a still further object of the present invention to provide a nickel-base brazing composition comprising an oxide-fluoride system and the process of using this composition.

It is another object of the present invention to provide an exothermic brazing composition, the reaction products of which are an oxide-fluoride ceramic phase and a nickel-manganese-silicon metal bonding phase and the process of using this composition.

It is a further object of the present invention to provide a brazing composition, the heat producing reactants of which are nickel oxide, manganese oxide, nickel fluoride and magnesium metal and the process of using this composition.

Other objects and advantages of the present invention, it is believed, will be apparent from the following detailed description of specific embodiments thereof.

Briefly, the brazing composition of the present invention comprises a metallic oxide and a substance capable of reducing this oxide and simultaneously generating a substantial amount of heat. In a preferred embodiment of the present invention, a metallic fluoride is combined with the metallic oxide and reducing agent to form a brazing composition. For example, nickel oxide and nickel fluoride may be employed as exothermic compounds which will yield nickel as a brazing material when combined with a reducing agent such as magnesium. It is also within the scope of the present invention to include additional compositions, e.g., compounds containing boron and/or silicon, to further improve the brazing composition.

The process of the present invention contemplates the use of the brazing composition of the present invention as the sole source of heat. The present invention further contemplates the use of additional heat sources where required to produce the desired bond strength. For example, an exothermic composition may be positioned externally of the metal interface or other suitable sources of supplemental heat, e.g., a furnace, may be used.

The present invention is further illustrated by the following examples in which all proportions are expressed in parts by weight unless otherwise indicated.

*Example 1*

A brazing material having the following composition was prepared:

| | Percent |
|---|---|
| Nickel oxide | 57.4 |
| Magnesium | 14.5 |
| Boron | 3.3 |
| Manganese dioxide | 12.3 |
| Borax ($Na_2O \cdot 2B_2O_3$) | 3.7 |
| $Li_2SiO_3$ | 8.8 |

An additional 6% $Li_2SiO_3$ and 4% nickel were then added to this composition.

Wafers having a weight of 2.5 grams and dimensions of 1" x 0.5" were prepared by compacting at 31,000 p.s.i. The base metal used in this example was 15-7 PH stainless steel. Coupons of this metal having dimensions of 1" x 4" x 0.025" were prepared and cleaned thoroughly. Two coupons were then overlapped 0.5" and the wafer positioned between the overlap.

The stainless steel coupons were brazed by assemblying the coupons and water in a jig and placing the entire fixture in a preheated furnace having a temperature of 1300° F. A pressure of 100 p.s.i. was applied to the overlap area during bonding. The power input to the furnace was then increased until ignition occurred. It was observed that ignition occurred at a temperature of about 1400° F. in less than four minutes. The sample was then removed and air cooled for 45 seconds before quenching in water. Five samples were then tested for shear strength and in each case it was found that rupture occurred in the base metal remote from the brazed joint before any rupture in the brazed joint. An average minimum shear strength of 3880 p.s.i. was obtained for the five samples and a maximum value of 5450 p.s.i. was obtained. Thus, these tests established that the brazed joint prepared according to this example had a shear strength of greater than 5,000 p.s.i.

The reaction products of the exothermic reaction were found to be a metallic phase comprising nickel and manganese and a ceramic phase comprising the oxides of magnesium, sodium and boron plus lithium silicate.

*Example 2*

A brazing material having the following composition was prepared:

| | Percent |
|---|---|
| Nickel oxide | 16.3 |
| Manganese oxide | 15.5 |
| Nickel fluoride | 26.1 |
| Magnesium | 16.2 |
| Boron (commercially-available amorphous boron—90 to 92% pure) | 0.65 |
| Borax | 10.9 |
| $SiO_2$ | 6.72 |
| Lithium fluoride | 6.8 |

This composition was used to braze the nickel base alloy René 41 (manufactured by Haynes Stellite Company) which also contains aluminum and titanium. Samples were prepared as described in Example 1 with the exception that the weight of the brazing composition wafer was varied as indicated in Table 1 and an external exothermic tape comprising 52.2% nickel oxide, 22.8% manganese oxide and 25% magnesium powder bonded with nitrocellulose on a nitrated cotton scrim cloth carrier in an amount sufficient to supply 887 calories of supplement heat was used to provide the heat for ignition. This external exothermic tape generates 780 calories per gram of exothermic mixture.

The results of Lap Shear Tests using René 41 base metal which had not been heat-treated are shown in Table 1, while the results of this test obtained with the same base metal which had been heat-treated are shown in Table 2.

TABLE I

| Text No. | Exotherm Weight, grams | Shear Tensile Strength, p.s.i. | Shear Stress, p.s.i. | Bond Thickness (in.) | Type Failure |
|---|---|---|---|---|---|
| Control | | 148,000 | | | |
| 1 | 2.75 | 148,000 | 8,000 | .012 | Base Metal. |
| 2 | 2.75 | 154,960 | 8,750 | .016 | Do. |
| 3 | 2.75 | 166,545 | 6,000 | .012 | Do. |
| 4* | 2.75 | 100,000 | 8,300 | .014 | Do. |
| 5 | 2.75 | 165,000 | 8,000 | .016 | Do. |
| 6 | 2.30 | 157,600 | 7,000 | .010 | Joint. |

Test Constant:
(1) Loading rate of 600 lbs./min. @ Room Temperature.
*Sample electroplated with 0.001" pure nickel.

TABLE 2

| Test No. | Temperature, °F. | Tensile Strength, p.s.i. | Minimum Shear Stress, p.s.i. | Type Failure |
|---|---|---|---|---|
| Control | R.T. | 159,380 | | |
| 1 | R.T. | 129,470 | 6,800 | Base Metal. |
| 2 | R.T. | 134,000 | 7,000 | Do. |
| 3 | 1,000 | 136,040 | 7,000 | Do. |
| 4 | 1,250 | 103,930 | 5,500 | Do. |
| 5 | 1,250 | 118,430 | 6,200 | Do. |
| 6 | 1,500 | 69,890 | 3,600 | Do. |
| 7 | 1,500 | 45,590 | 2,400 | Do. |
| 8 | 1,700 | 30,190 | 1,700 | Do. |
| 9 | 1,700 | 23,190 | 1,200 | Do. |

Test Constants:
Strain rate—.05"/min.
Heat Treatment—
Solution heat treatment—1950° F. for 30 min.
Precipitation heat treatment 1,400° F. for 16 hours.
Hardness: 34 to 35 Rockwell "C" in bond area; 38 to 40 Rockwell "C" in grip area.

The bonds produced in Tests Nos. 1–5 of Table 1 were exceptionally free of ceramic inclusions. The sample used in Test No. 6, which was the only sample to fail in shear along the bondline, showed only a small bonded area and ceramic inclusions. It is believed that the relatively poor character of this test specimen was the result of insufficient heat generation by the exothermic brazing composition because of the relatively low weight of this composition.

The specimen used in Test No. 4 of Table 1 which had been nickel plated prior to bonding broke a considerable distance from the bond zone indicating that the bond strength of the base metal was not affected by the heat generated for bonding. Furthermore, it was significant that only one of the unplated specimens ruptured at a stress less than that of the control, thus indicating that there was little or no detrimental effect caused by the brazing process.

The heat treated specimens of Table 2 all failed in the base metal rather than at the brazed joint. It was significant that useable shear stresses and tensile strengths were obtained for specimens 8 and 9 which were heated to 1700° F., indicating that the samples of Table 2 would be useful in high temperature environments.

It was found that the reaction products of the brazing composition of this example comprised a 41% metal phase comprising 81.9% nickel, 16.9% manganese and 1.2% silicon and a ceramic phase comprising 24.6% magnesium oxide, 26.1% magnesium fluoride, 16.8% borax, 9.75% silicon dioxide, 9.85% lithium fluoride, and the balance containing primarily unreacted metal oxides. It was also found that the heat generated by the exothermic reaction of this brazing composition was 590 calories per gram of exotherm. The melting temperature of the metallic phase was found to be about 2100° F.

*Example 3*

The brazing compositions of Examples 1 and 2 were used to prepare brazed joints and tested as described therein with a cobalt base alloy, Haynes Alloy No. 25 (manufactured by Haynes Stellite Company). This base metal is relatively ductile and it was found that failure occurred at 5500 p.s.i. in the base metal for both types of brazed joints. The brazed joints of this example were found to be entirely satisfactory.

The braze composition of Example 2 was also tested with 15–7 PH stainless steel and was found to produce excellent brazed joints.

The brazing compositions described in the foregoing examples may be modified considerably without departing from the scope of the present invention. For example, if the composition of Example 2 is considered to comprise two component systems as follows:

*Component 1*

| | Percent |
|---|---|
| Magnesium | 17.8 |
| Nickel oxide | 27.2 |
| Manganese oxide | 25.8 |
| Borax | 18.2 |
| $SiO_2$ | 11.2 |

*Component 2*

| | |
|---|---|
| Manganese | 16.3 |
| Boron | 1.63 |
| Nickel fluoride | 65.2 |
| Lithium fluoride | 17.0 |

It has been found that satisfactory braze joints may be obtained when the ratio of Component 1 to Component 2 is in the range of about 60:40 to about 40:60 with an optimum for many base metals including those used in Examples 1–3 of about 60:40.

In this composition, Component 1 may be considered the "oxide phase" and Component 2 may be considered the "fluoride phase." In general, the oxide phase is particularly useful because of the heat generated thereby while the fluoride phase is particularly useful because it promotes free flow and displacement of the ceramic base formed by the exothermic reaction from the bondline. Thus, brazing compositions having varying properties for particular uses may be formulated by emphasizing the oxide or the fluoride phase.

Furthermore, it has been found that for particular uses, various amounts of lithium silicate, copper, silver, fluoride, nickel and aluminum oxide may be added to the composition of Example 1.

As is well known to those well skilled in the art, brazing is often defined as a welding process wherein the bonding metal is a nonferrous metal or alloy whose melting point is higher than 900° F., but lower than that of the metals or alloys to be joined. In exothermic brazing, the melting point of the brazing composition may even exceed that of the base metals because of the extremely short time at which the brazing composition is at its melting temperature. According to the practice of the present invention, the brazing composition is heated to a temperature sufficient to initiate the exothermic reaction between the ingredients thereof and this reaction is allowed to continue until substantially all of the metallic phase has been reduced to native metal and until the heat produced by the reaction is sufficiently high to allow the native metal or metals to flow. The native metals are then allowed to cool whereby the base metal pieces are united.

It will be readily apparent to those skilled in the art that the present invention provides a novel and improved composition and method for brazing metals by means of an exothermic brazing composition, the products of which supply the metallic brazing alloy, the flux, and at least the major part of the brazing heat required. The process of the present invention may be practiced in air without the use of either vacuum or protective furnace atmospheres. The exothermic reaction may be initiated by heating in a furnace to about 1,000° F. or by means of a battery wire or fuse at room temperature or still other suitable means known to those skilled in the art. Preferably, the parts to be joined are held in a jig under moderate pressure to bring the bonding area together as an exothermic reaction occurs.

Having fully described the present invention, it is to be understood that it is not to be limited to the specific details set forth, but is of the full scope of the appended claims.

I claim:

1. An exothermic brazing composition consisting essentially of nickel oxide, a metallic fluoride and a solid reducing agent.

2. An exothermic brazing composition consisting essentially of nickel oxide, nickel fluoride and a solid reducing agent.

3. An exothermic brazing composition consisting essentially of nickel oxide and magnesium.

4. An exothermic brazing composition consisting essentially of nickel oxide, manganese dioxide, magnesium, boron, borax and lithium silicate.

5. An exothermic brazing composition consisting essentially of nickel oxide, nickel fluoride and magnesium.

6. An exothermic brazing composition consisting essentially of nickel oxide, nickel fluoride, magnesium and a composition selected from the group consisting of manganese oxide, boron, borax, silicon dioxide, lithium fluoride and mixtures thereof.

7. An exothermic brazing composition comprising an oxide phase consisting essentially of nickel oxide, magnesium, manganese oxide, borax and silicon dioxide; and a fluoride phase consisting essentially of nickel fluoride, lithium fluoride, magnesium and boron.

8. The composition of claim 7 wherein the ratio of said oxide phase to said fluoride phase is in the range of about 60:40 to about 40:60.

9. The composition of claim 8 wherein said ratio is about 60:40.

10. An exothermic brazing composition consisting essentially of about 16.3 weight percent nickel oxide, about 3.3% boron, about 14.5% magnesium, about 12.3% manganese dioxide, about 3.7% borax and about 8.8% lithium silicate.

11. An exothermic brazing composition consisting essentially of about 16.3 weight percent nickel oxide, about 26.1% nickel fluoride, about 15.5% manganese oxide, about 16.2% magnesium, about 0.65% boron, about 10.9% borax, about 6.72% silicon dioxide and about 6.8% lithium fluoride.

12. An exothermic brazing composition comprising an oxide phase consisting essentially of about 27.2% weight percent nickel oxide, about 25.8% manganese oxide, about 17.8% magnesium, about 18.2% borax and about 11.2% silicon dioxide; and a fluoride phase consisting essentially of about 65.2 weight percent nickel fluoride, about 17.0% lithium fluoride, about 16.3% magnesium and about 1.63% boron.

13. The method of uniting two metal pieces comprising: placing at the joint of said metal pieces a metallic composition, said metallic composition being selected from the group consisting of nickel oxide and a mixture of metallic oxide and metallic fluoride, said composition also containing a reducing agent, the metals of said oxide and said fluoride having melting points lower than either metal piece and higher than 900° F.; heating the metallic composition to a temperature sufficient to initiate the reaction between said selected composition and said reducing agent; allowing said reaction to continue until substantially all of said selected composition has been reduced to native metal and until the heat produced by the reaction is sufficiently high to allow said native metal to flow but less than that which will cause a substantial portion of either metal piece to melt; and allowing said native metals to cool whereby said metal pieces are united.

14. The process of claim 13 wherein said reducing agent comprises magnesium.

15. The process of claim 13 wherein said metal oxide is nickel oxide, said metal fluoride is nickel fluoride and said reducing agent comprises magnesium.

16. The process of claim 13 wherein said heating is caused by a furnace.

17. The process of claim 13 wherein said heating is caused by an exothermic composition.

18. The process of claim 13 wherein said metal pieces comprise stainless steel.

19. The method of uniting two metal pieces comprising: placing at the joint of one of said metal pieces, a metallic composition consisting essentially of a metallic fluoride, nickel oxide, and a reducing agent, the metal of said fluoride having a melting point lower than either metal piece and higher than 900° F.; heating the composition to a temperature sufficient to initiate the reaction between said oxide and fluoride, and said reducing agent; allowing said reaction to continue until substantially all of the oxide and fluoride have been reduced to native metal, and until the heat produced by the reaction is sufficiently high to allow the native metal to flow; and allowing said native metal to cool whereby said metal pieces are united.

20. The method of uniting two metal pieces comprising: placing at the joint of said metal pieces, a metallic composition consisting essentially of nickel oxide and a reducing agent; heating the metallic composition to a temperature sufficient to initiate the relation between said nickel oxide and said reducing agent, allowing said reaction to continue until substantially all of said oxide has been reduced to native metal and until the heat produced by the reaction is sufficiently high to allow said native metal to flow; and allowing said native metals to cool whereby said metal pieces are united.

21. An exothermic brazing composition comprising an oxide phase consisting essentially of by weight about 27.2% nickel oxide, about 25.6% manganese oxide, about 17.8% magnesium, about 18.2% borax, and about 11.2% silicon dioxide; and a fluoride phase consisting essentially of about 65.2% nickel fluoride, about 17.0% lithium fluoride, about 16.3% magnesium and about 1.63% boron, wherein the ratio of said oxide phase to said fluoride phase is in the range of from about 55:45 to about 40:60.

22. An exothermic brazing composition comprising an oxide phase consisting essentially of by weight about 27.2% nickel oxide, about 25.8% manganese oxide, about 17.8% magnesium, about 18.2% borax, and about 11.2% silicon dioxide; and a fluoride phase consisting essentially of about 65.2% nickel fluoride, about 17.0% lithium fluoride, about 16.3% magnesium and about 1.63% boron, wherein the ratio of said oxide phase to said fluoride phase is about 60:40.

References Cited by the Examiner

UNITED STATES PATENTS

| 1,813,904 | 7/1931 | Brunhubner | 29—498 |
| 1,872,254 | 8/1932 | De Golyer | 29—504 XR |
| 2,362,245 | 2/1949 | Wooten. | |
| 3,020,610 | 2/1962 | Redjak | 149—37 XR |
| 3,069,765 | 12/1962 | Simpelaar | 29—504 |

FOREIGN PATENTS 415,181   8/1934   Great Britain.

JOHN F. CAMPBELL, *Primary Examiner.*

WHITMORE A. WILTZ, *Examiner.*

P. M. COHEN, *Assistant Examiner.*